United States Patent [19]

Robertson

[11] Patent Number: 5,717,876

[45] Date of Patent: Feb. 10, 1998

[54] METHOD FOR AVOIDING LIVELOCK ON BUS BRIDGE RECEIVING MULTIPLE REQUESTS

[75] Inventor: Paul Gordon Robertson, Austin, Tex.

[73] Assignee: International Business Machines Corporation, Armonk, N.Y.

[21] Appl. No.: 606,912

[22] Filed: Feb. 26, 1996

[51] Int. Cl.$^6$ .......................... G06F 13/00; G06F 13/40
[52] U.S. Cl. ...................... 395/309; 395/308; 395/474; 395/856; 370/402
[58] Field of Search ........................ 395/306–309, 395/281, 293, 474, 822, 856, 872; 370/401–402

[56] References Cited

U.S. PATENT DOCUMENTS

| | | | |
|---|---|---|---|
| 5,151,900 | 9/1992 | Snyder et al. | 370/400 |
| 5,175,733 | 12/1992 | Nugent | 370/400 |
| 5,369,745 | 11/1994 | Faber | 395/200.15 |
| 5,426,739 | 6/1995 | Lin et al. | 395/309 |
| 5,455,915 | 10/1995 | Coke | 395/293 |
| 5,535,341 | 7/1996 | Shah et al. | 395/306 |
| 5,542,056 | 7/1996 | Jaffa et al. | 395/306 |
| 5,546,546 | 8/1996 | Bell et al. | 395/292 |
| 5,568,619 | 10/1996 | Blackledge et al. | 395/281 |
| 5,574,864 | 11/1996 | Emerson et al. | 395/280 |
| 5,581,714 | 12/1996 | Amini et al. | 395/308 |
| 5,586,268 | 12/1996 | Chen et al. | 395/250 |
| 5,594,882 | 1/1997 | Bell | 395/421.02 |
| 5,603,051 | 2/1997 | Ezzet | 395/822 |
| 5,625,779 | 4/1997 | Solomon et al. | 395/293 |
| 5,630,094 | 5/1997 | Hayek et al. | 395/473 |

Primary Examiner—Gopal C. Ray
Attorney, Agent, or Firm—Diana L. Roberts; Richard A. Henkler; Andrew J. Dillon

[57] ABSTRACT

A method prevents a livelock condition from occurring between a host bus bridge and a PCI bridge, where the host bus bridge and PCI bridge conform to the specification delineated in the PCI-to-PCI Bridge Architecture Specification 1.0 and PCI Local Bus Specification 2.0. The method includes the first step of in response to at least first and second requests being substantially simultaneously received from at least first and second peripherals, determining if a state of a state machine corresponds to an assigned order of either the first peripheral or the second peripheral. The second step includes if the state does not correspond to the assigned order of the first peripheral or the second peripheral, advancing the state and repeating the first step until the state corresponds to one of the first or second peripherals. The third step includes if the state corresponds to the assigned order of either the first or second peripheral, determining if the selected request targets system memory. The fourth step includes if the selected request targets system memory, requesting the host bus bridge to flush all existing I/O requests and postpone any future I/O requests from a central processing unit. The fifth step includes in response to a notification from the host bus bridge that all I/O requests have been flushed and that any future I/O requests from the central processing unit will be postponed, unmasking the selected request to the bus bridge, thereby granting access of the secondary bus to the selected peripheral.

2 Claims, 4 Drawing Sheets

FIG. 1

PRIOR ART

METHOD FOR AVOIDING LIVELOCK ON BUS BRIDGE RECEIVING MULTIPLE REQUESTS

CROSS-REFERENCE TO RELATED APPLICATIONS

The present invention contains subject matter which may be related to patent application Ser. Nos. 606,913, and 606,914, and docket numbers AT9-95-142 and AT9-96-006, filed Feb. 26, 1996.

BACKGROUND OF THE INVENTION

1. Field of the Invention

The present invention relates to incompatibility between a host bus bridge and one or more bus bridges and, more particularly, but without limitation, to avoiding a livelock condition between a host bus bridge and a PCI-to-PCI bus bridge.

2. Background Information and Description of the Related Art

Figure 1:
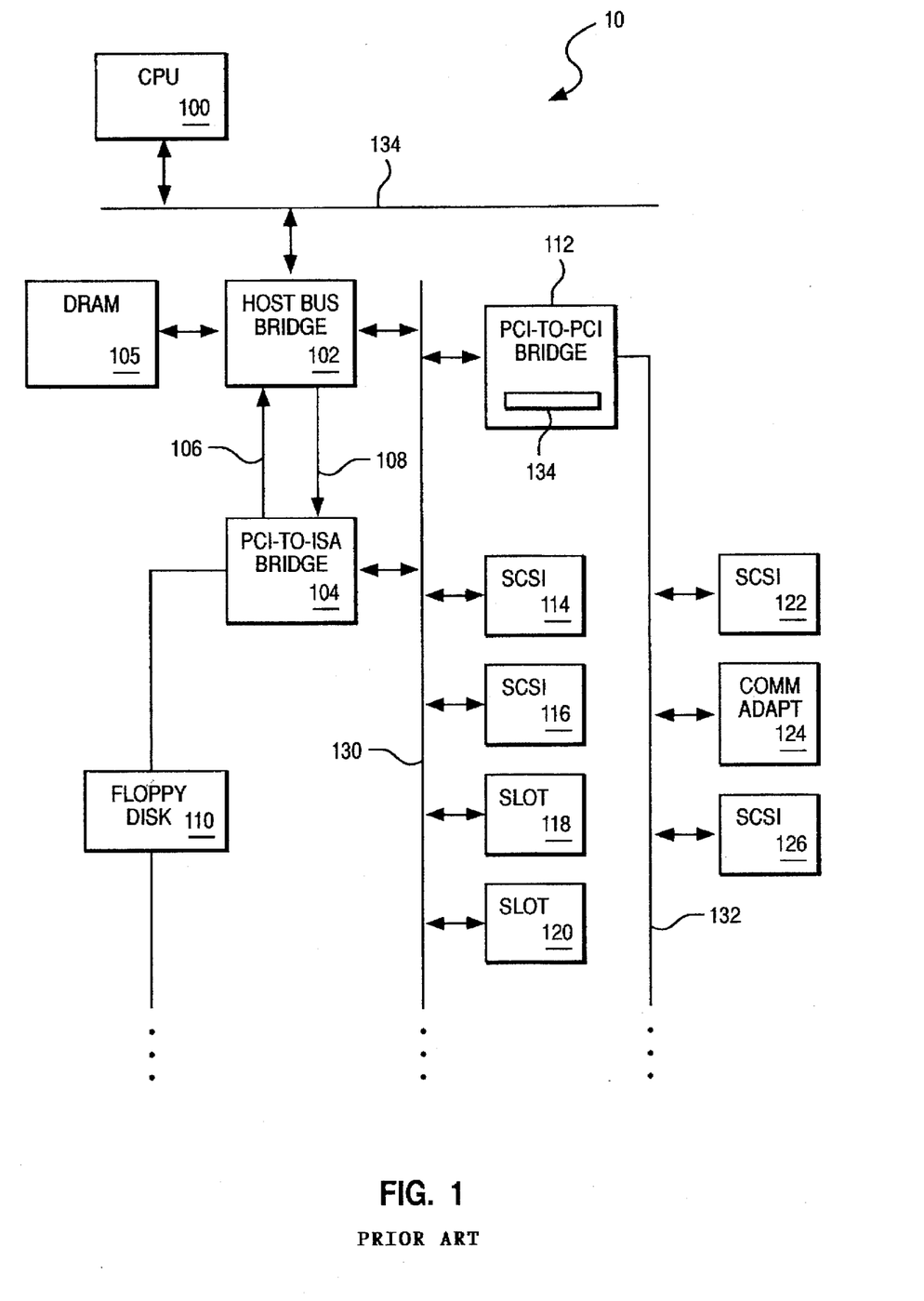
FIG. 1 illustrates a schematic diagram of a conventional architecture subject to a livelock condition.

FIG. 1 illustrates a schematic diagram of a conventional architecture including CPU 100, which could be, for example, PowerPC or x86 based, a host bus bridge (e.g., memory controller) 102 connected to CPU 100 via 64 bit host bus 134, and system memory 102 (e.g., DRAM) connected to host bus bridge 102. Thirty two bit primary PCI bus 130 interconnects host bus bridge 102 to a variety of adapters (e.g., SCSIs 114 and 116), peripherals (not shown) and/or adapter slots 118 and 120.

Primary PCI bus 130 is limited on how many electrical loads it can drive. However, PCI bridges may be connected to primary PCI bus 130 so that additional loads can be added. Illustratively, PCI-to-PCI bridge (herein PCI bridge) 112 connects adapters 122, 124, and 126 via secondary PCI bus 132 to primary PCI bus 130, while PCI-to-ISA bridge (herein ISA bridge) 104 connects peripherals, such as floppy disk 110, to primary PCI bus 130.

However, because ISA direct memory access (DMA) cannot be suspended once initiated, ISA bridge 104 must guarantee that host bus bridge 102 will not suspend access to system memory 105 after ISA bridge 104 attempts a DMA. To do so, ISA bridge 104 asserts a PCI sideband signal FLUSHREQ* on connection 106 which, when asserted, requests that host bus bridge 102 flush any PCI bus transactions in progress. In response, host bus bridge 102 asserts a PCI sideband signal MRMACK* on connection 108 after it has flushed any PCI transactions in progress, and, will suspend any further requested PCI transactions while it asserts MEMACK*. In this manner, host bus bridge 102 guarantees ISA bridge 104 that it will not suspend access to system memory 105 once ISA bridge 104 begins a DMA.

Unfortunately, no such guarantee can be made from host bus bridge 102 to PCI bridge 112. The PCI-to-PCI Bridge Architecture Specification 1.0 and the PCI Local Bus Specification 2.0 delineate two requirements that can cause a livelock condition. First, PCI bridge 112 must flush its internal write buffer 134 before it can allow transfer of data to/from secondary PCI bus 132. Second, host bus bridge 102 must complete in process I/Os before allowing PCI bridge 112 to store memory write data into system memory 105. Hypothetically, a livelock condition may occur, for example, when SCSI adapter 122 generates a memory write transaction (e.g., MEMORY WRITE or MEMORY WRITE AND INVALIDATE) targeting system memory 105. In response, PCI bridge 112 completes the transaction with SCSI adapter 122 and its peripheral (not shown) and posts the memory write data in internal write buffer 134. However, in this hypothetical, before the posted memory write data can be flushed (i.e., written to system memory 105), CPU 100 initiates a PCI non-postable transaction that targets a device on secondary PCI bus 132 and, therefore, must cross PCI bridge 112.

Non-postable PCI transactions include, for example, MEMORY READ, MEMORY READ LINE, MEMORY READ MULTIPLE, I/O READ, I/O WRITE, CONFIGURATION READ, and CONFIGURATION WRITE. When this sequence occurs, the conditions triggering the livelock have been established. The PCI-to-PCI Bridge Architecture Specification 1.0 requires that PCI bridge 112 terminate the non-posted access from CPU 100 by signalling retry because the posted memory write data reins in its internal write buffer 134. This requirement preserves the x86 and PowerPC processor architecture ordering rules necessary for correct operation of device drivers and hardware. Therefore, the posted memory write data in internal write buffer 134 must be flushed before PCI bridge 112 will allow the non-posted transaction to proceed. However, host bus bridge 102 will not allow access to system memory 105 by PCI bridge 112 until the PCI transaction initiated by CPU 100 completes. Host bus bridge 102 will simply repeat the retry transaction continuously. In response, PCI bridge 112 will terminate the transaction by signalling retry because it has been unable to flush its internal write buffer 134. This will repeat continuously, resulting in a PCI bus livelock condition.

Accordingly, there would be great demand for a technique that allows host bus bridge 102 and PCI bridge 112 to conform to the requirements delineated in the PCI-to-PCI Bridge Architecture Specification 1.0 and the PCI Local Bus Specification 2.0, while avoiding a livelock condition. This technique should delay secondary PCI bus 132 device write accesses to system memory 105 until a guarantee can be made that host bus bridge 102 has flushed any PCI transactions in progress and will postpone any further PCI transactions until all memory write data has been stored in system memory 105.

SUMMARY

In accordance with the present invention, a method prevent a livelock condition from occurring between a host bus bridge and a PCI bridge, where the host bus bridge and PCI bridge conform to the specification delineated in the PCI-to-PCI Bridge Architecture Specification 1.0 and PCI Local Bus Specification 2.0. Specifically, the method prevents a livelock condition from occurring between a host bus bridge that must complete all in process I/O requests before allowing access to system memory and a PCI bridge that must flush its internal write buffer before allowing transfer of data to/from a secondary PCI bus. The method includes the first step of in response to at least first and second requests being substantially simultaneously received from at least first and second peripherals, determining if a state of a state machine corresponds to an assigned order of either the first peripheral or the second peripheral. The second step includes if the state does not correspond to the assigned order of the first peripheral or the second peripheral, advancing the state and repeating the first step until the state corresponds to one of the first or second peripherals. The third step includes if the state corresponds to the assigned order of either the first or second peripheral, determining if the selected request targets system memory. The fourth step includes if the selected request targets system memory, requesting the host bus bridge to flush all existing I/O requests and postpone any future I/O requests from a central processing unit. The fifth step includes in response to a notification from the host bus bridge that all I/O requests have been flushed and that any future I/O requests from the central processing unit will be postponed, unmasking the selected request to the bus bridge, thereby granting access of the secondary bus to the selected peripheral.

DETAILED DESCRIPTION OF THE PREFERRED EMBODIMENT

Figure 2:
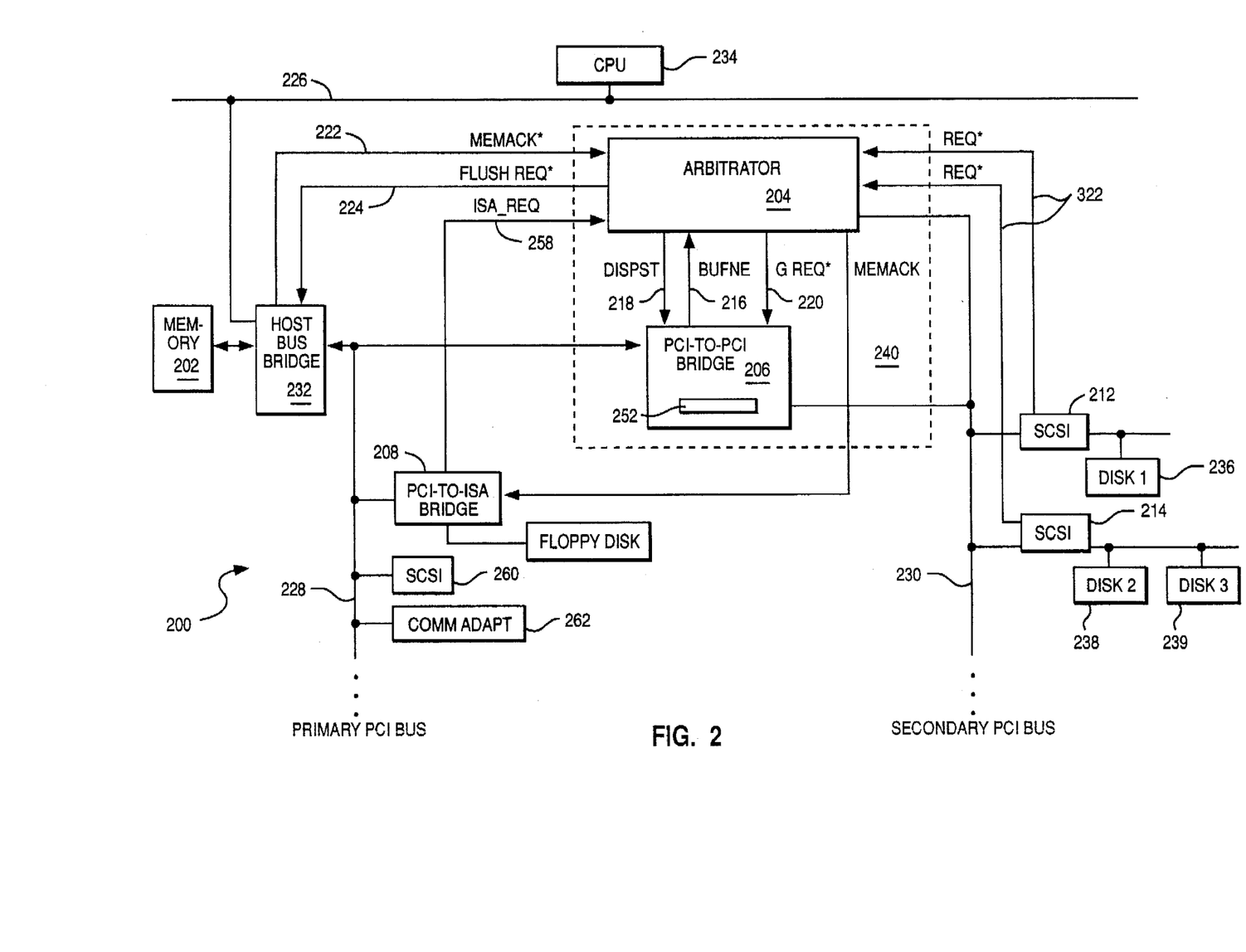
FIG. 2 illustrates a schematic diagram of an architecture having a unique bus negotiator for preventing a livelock condition in accordance with the present invention.

FIG. 2 illustrates a schematic diagram of architecture 200 having a unique bus negotiator in accordance with the preferred embodiment. Specifically, architecture 200 includes bus negotiator 240, having PCI-to-PCI bridge (herein PCI bridge) 206 and arbitrator 204. In the preferred embodiment, PCI bridge 206 is implemented within arbitrator 204 (collectively referred to as bus negotiator 240), although arbitrator 204 could be implemented separately from PCI bridge 206.

Architecture 200 further includes a number of interconnected components, such as any suitable CPU 234 (in the preferred embodiment, a PowerPC 604), any suitable host bus bridge 232 (e.g., memory controller) connected to host bus 226, any suitable bus master device (e.g., SCSI adapter 212), and any suitable system memory 202. As previously described, PCI bridge 206 and host bus bridge 232 conform to the specifications delineated in the PCI-to-PCI Bridge Architecture Specification 1.0 and PCI Local Bus Specification 2.0.

Primary PCI bus 228 connects a variety of peripherals, such as PCI-to-ISA bridge 208, SCSI adapter 260, and communications adapter 262, to host bus bridge 232 and PCI bridge 206. However, unlike the conventional architecture described in FIG. 1, ISA bridge 208 asserts a request signal (i.e., ISA REQ_ 258, "_" indicating active LOW) to arbitrator 204, and does not assert a FLUSHREQ_ sideband signal to host bus bridge 232 (described in more detail herein). Secondary PCI bus 230 connects a variety of peripherals and adapters, such as SCSI adapters 212 and 214 and disks 236, 238, and 239, to PCI bridge 206 and arbitrator 204. Alternatively, other arrangements of peripherals could be made and/or additional stages of bridges added without departing from the scope and spirit of the preferred embodiment.

Figure 3:
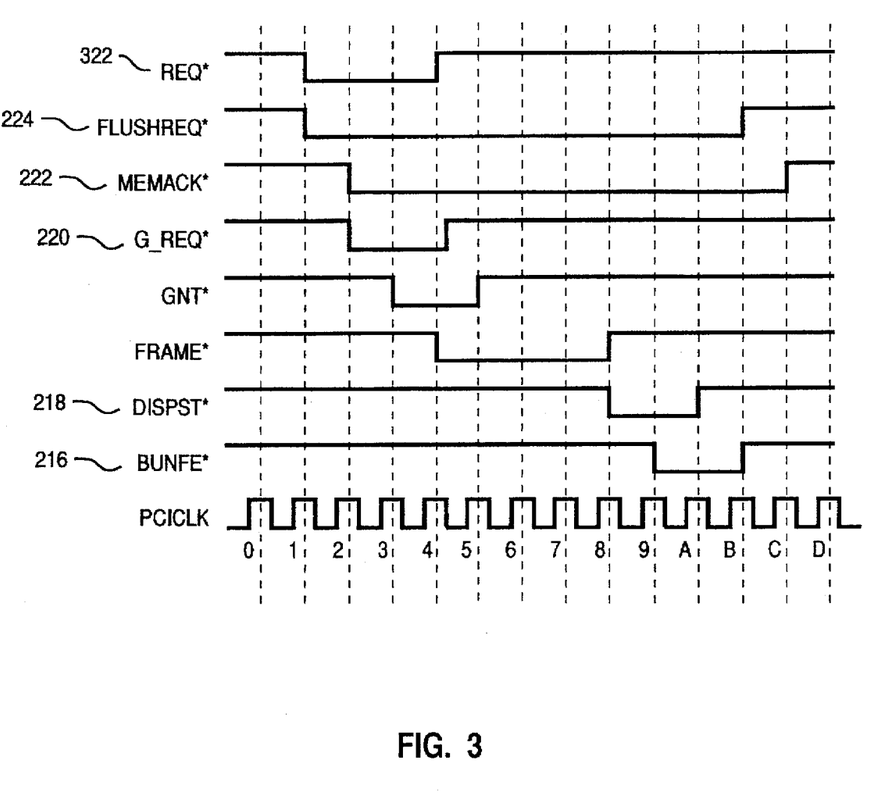
FIG. 3 illustrates a timing diagram of a hypothetical transaction for the architecture of FIG. 2.

FIG. 3 illustrates a timing diagram for use with architecture 200 shown in FIG. 2. Referring to FIGS. 2 and 3, at clock 0, primary and secondary PCI buses 228 and 230 are initially idle, waiting for a primary, secondary, or another stage (not shown) PCI bus device to assert its REQ_ signal. Next, for sake of illustration, at clock 1, a PCI device on secondary PCI bus 230 (e.g., SCSI adapter 212) asserts REQ_ 322 until it is granted secondary PCI bus access from PCI bridge 206 to initiate a WRITE, MEMORY WRITE or MEMORY WRITE AND INVALIDATE transaction. Arbitrator 204 temporarily masks off the asserted REQ_ from PCI bridge 206. Alternatively, arbitrator 204 could have received an asserted ISA REQ_ 258 from ISA bridge 208.

In response to a received REQ_ 322 or 258, at clock 1, arbitrator 204 asserts FLUSHREQ_ 224 to host bus bridge 232. Arbitrator 204 continues to assert FLUSHREQ_ 224 until it detects that data from SCSI adapter 212 has been successfully delivered to system memory 202 (described in more detail herein). When host bus bridge 232 has flushed all PCI transactions, it asserts MEMACK_ 222, which, in this example, occurs at clock 2. Host bus bridge 232 continues to assert MEMACK_ 222 while arbitrator 204 asserts FLUSHREQ_ 224, thereby postponing any further host bus bridge 232 initiated PCI transactions. Similarly, if ISA bridge 208 asserted REQ_ 258, it requests and receives control of primary PCI bus 228 to perform DMA access to system memory 202.

In response to host bus bridge 232 asserting MEMACK_ 222, at clock 2, arbitrator 204 forwards the asserted SCSI adapter 212 REQ_ to PCI bridge 206 on G_REQ_ 220, thereby allowing PCI bridge 206 to detect the request. In response, PCI bridge 206 asserts GNT_ to the requesting device (e.g., SCSI adapter 212) at clock 3, thereby relinquishing control of secondary PCI bus 230 to the requesting device (e.g., SCSI adapter 212). In response, the requesting device will initiate a secondary PCI bus transaction by asserting PCI signal FRAME* at clock 4. If the initiated PCI transaction is a postable PCI transaction targeting system memory 202 (e.g., MEMORY WRITE or MEMORY WRITE AND INVALIDATE), the requesting device writes data into internal write buffer 252 of PCI bridge 206. Otherwise, arbitrator 204 de-asserts FLUSHREQ_ and control returns to the idle state of clock 1.

In response to the requesting device de-asserting FRAME* at clock 8, indicating it has finished transmitting data to internal write buffer 252, arbitrator 204 asserts DISPST* 218 for two clock cycles at clock 8 to determine the status of internal write buffer 252. PCI bridge 206 responds within one clock cycle (i.e., clock 9) by asserting BUFNE* 216, indicating that the posted internal write buffer 252 is not empty. Otherwise, PCI bridge 206 fails to assert BUFNE* 216, indicating that the posted internal write buffer 252 is empty. In BUFNE* 216 is asserted, at clock A, arbitrator 204 de-asserts DISPST* 218 and waits for PCI bridge 206 to de-assert BUFNE* 216, indicating that posted internal write buffer 252 has been flushed to system memory 202. In this example, PCI bridge 206 de-asserts BUNFE* 216 at clock B and, in response, arbitrator 204 de-asserts FLUSHREQ_ 224 at clock B. In response to FLUSHREQ_ 224 being de-asserted, host bus bridge 232 de-asserts MEMACK_ 222 at clock C.

Accordingly, arbitrator 204 allows host bus bridge 232 and PCI bridge 206 to conform to the requirements delineated in the PCI-to-PCI Bridge Architecture Specification 1.0 and the PCI Level Bus Specification 2.0, while avoiding a livelock condition. To do so, arbitrator 204 delays secondary PCI bus 230 device write accesses to system memory 202 until a guarantee is made from host bus bridge 232 that it has flushed any PCI transactions in progress and will postpone any further PCI transactions until all memory write data has been stored in system memory 202.

Figure 4:
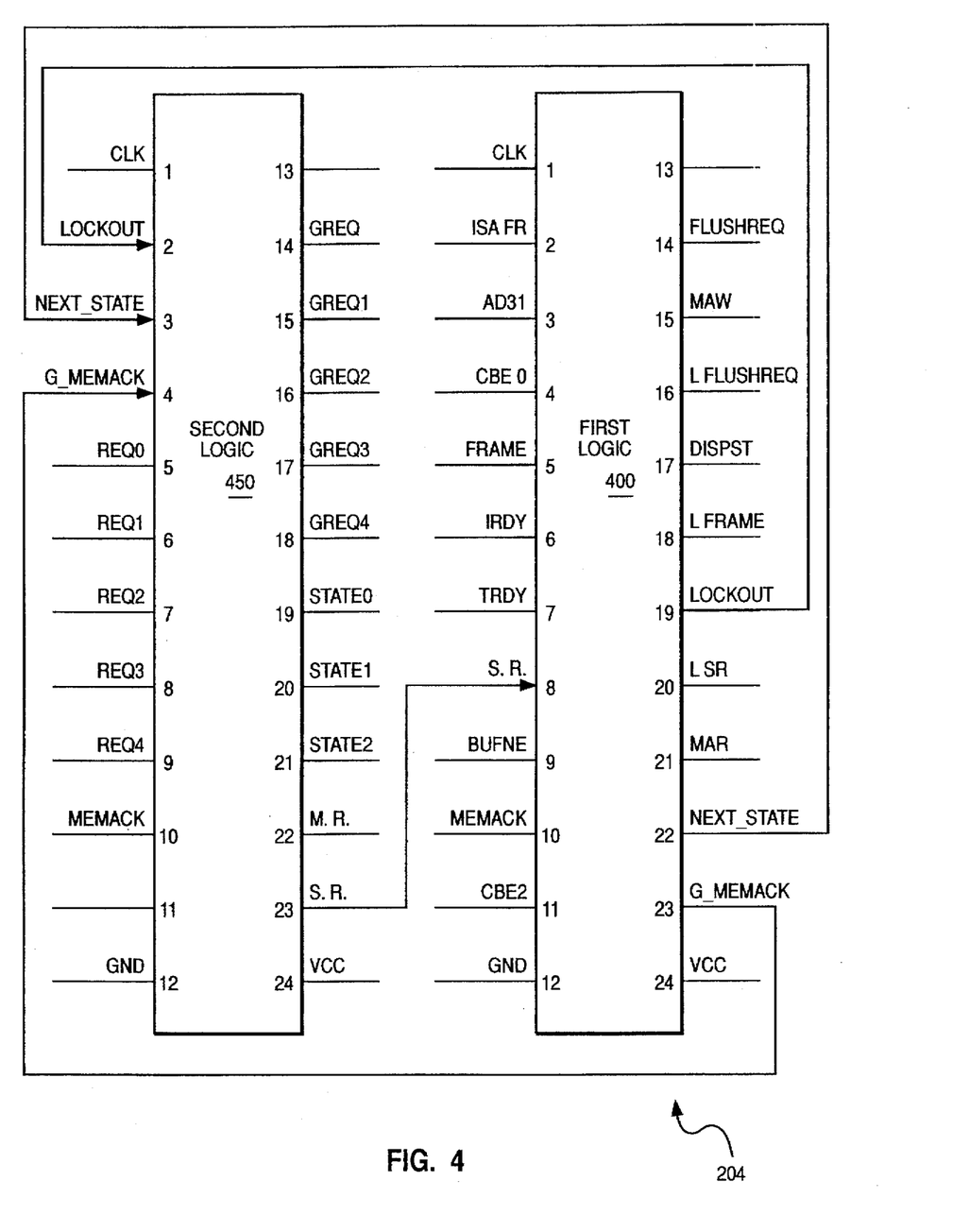
FIG. 4 illustrates the arbitrator in accordance with the present invention.

FIG. 4 illustrates a detailed view of arbitrator 204. Arbitrator 204 includes two 24 pin logic chips, namely first logic 400 and second logic 450. However, one skilled in the art readily recognizes that additional chips or other hardware configurations could be utilized to perform the described functions. Pin designations and descriptions are provided below. An "_" after any pin name indicates active LOW:

| | | | PIN Declarations For First Logic 400 |
|---|---|---|---|
| PIN 1 | PCICLK | COMB. ; | CLOCK INPUT |
| PIN 2 | EISA_FLUSHREQ_ | COMB. ; | INPUT, GENERATED BY ISA BRIDGE |
| PIN 3 | SAD31 | COMB. ; | INPUT, HIGH ORDER ADR/DATA BIT ASSERTED BY ANY DEVICE ON SECONDARY BUS 230 INDICATING USE OF MEMORY CONTROLLER; |
| PIN 4 | SCBE0 | COMB. ; | INPUT, SIDEBAND SIGNAL ASSERTED BY ANY DEVICE ON SECONDARY BUS 230 INDICATING A WRITE |
| PIN 5 | SFRAME_ | COMB. ; | INPUT, ASSERTED BY A DEVICE WHEN IT TAKES CONTROL OF SECONDARY BUS 230 |
| PIN 6 | SIRDY_ | COMB. ; | INPUT, ASSERTED BY A DEVICE ON SECONDARY BUS 230 WHEN IT IS READY TO TRANSMIT DATA |
| PIN 7 | STRDY_ | COMB. ; | INPUT, ASSERTED BY TARGET DEVICE WHEN IT IS READY TO RECEIVE DATA ON SECONDARY BUS 230 (E.G., PCI BRIDGE 206) |
| PIN 8 | SERIALREQ_ | COMB. ; | INPUT GENERATED BY SECOND LOGIC 450 INDICATING A REQUEST IS WAITING FROM DEVICE ON SECONDARY BUS 230 |
| PIN 9 | BUFNE_ | COMB. ; | INPUT, ASSERTED BY PCI BRIDGE 206 WHEN INTERNAL WRITE BUFFER 252 IS NOT EMPTY |
| PIN 10 | MEMACK_ | COMB. ; | INPUT GENERATED BY HOST BUS BRIDGE 232 INDICATING IT HAS FLUSHED CPU I/O'S AND WILL POSTPONE OTHERS |
| PIN 11 | SCBE2 | COMB. ; | INPUT ASSERTED BY DEVICE ON SECONDARY BUS 230 INDICATING READ OR WRITE DEPENDING ON SCBE0 |
| PIN 12 | GND | ; | GROUND |
| PIN 13 | NC | ; | NO CONNECTION |
| PIN 14 | CPU_FLUSHREQ_ | COMB. ; | OUTPUT TO HOST BUS BRIDGE 232 REQUESTING IT TO FLUSH ALL I/O'S AND POSTPONE OTHERS |
| PIN 15 | DMAW_ | REG. ; | OUTPUT, ASSERTED INDICATING MEMORY ACCESS WRITE BY A DEVICE ON SECONDARY BUS 230 |
| PIN 16 | LCPU_FLUSHREQ_ | REG. ; | OUTPUT, LATCHED FLUSHREQ_ |
| PIN 17 | LDISPST_ | REG. ; | OUTPUT TO PCI BRIDGE 206 WANTING TO KNOW IF ANY DATA IS IN INTERNAL WRITE BUFFER 252 |
| PIN 18 | LSFRAME_ | REG. ; | OUTPUT, LATCHED FRAME_ |
| PIN 19 | LOCKOUT_ | REG. ; | OUTPUT TO SECOND LOGIC 450 |
| PIN 20 | LSERIALREQ_ | REG. ; | OUTPUT, LATCHED SERIAL REQ_ |
| PIN 21 | DMAR_ | REG. ; | OUTPUT, ASSERTED WHEN DEVICE ON SECONDARY BUS DESIRES MEMORY ACCESS READ |
| PIN 22 | NEXT_STATE_ | REG. ; | OUTPUT TO SECOND LOGIC 450, ADVANCE TO NEXT STATE IF THERE IS ANOTHER REQ WAITING |
| PIN 23 | G_MEMACK_ | REG. ; | OUTPUT TO SECOND LOGIC 450 |
| PIN 24 | VCC | | |
| | | | PIN Declarations For Second Logic 450 |
| PIN 1 | PCICLK | COMB. ; | INPUT CLOCK |
| PIN 2 | LOCKOUT_ | COMB. ; | INPUT FROM FIRST LOGIC 400 |
| PIN 3 | NEXT_STATE_ | COMB. ; | INPUT FROM FIRST LOGIC 400 |
| PIN 4 | G_MEMACK_ | COMB. ; | INPUT FROM FIRST LOGIC 400 |
| PIN 5 | REQ0_ | COMB. ; | INPUT REQUEST FROM DEVICE 0 ON SECONDARY BUS 230 |
| PIN 6 | REQ1_ | COMB. ; | INPUT REQUEST FROM DEVICE 1 ON SECONDARY BUS 230 |
| PIN 7 | REQ2_ | COMB. ; | INPUT REQUEST FROM DEVICE 2 ON SECONDARY BUS 230 |
| PIN 8 | REQ3_ | COMB. ; | INPUT REQUEST FROM DEVICE 3 ON SECONDARY BUS 230 |
| PIN 9 | REQ4_ | COMB. ; | INPUT REQUEST FROM DEVICE 4 ON SECONDARY BUS 230 |
| PIN 10 | MEMACK_ | COMB. ; | INPUT FROM FIRST LOGIC 400 |
| PIN 11 | NC | ; | NO CONNECTION |
| PIN 12 | GND | ; | GROUND |
| PIN 13 | NC | ; | NO CONNECTION |
| PIN 14 | GREQ0_ | COMB. ; | OUTPUT TO PCI BRIDGE 206 CORRESPONDING TO REQUEST 0 FROM A DEVICE 0 ON SECONDARY BUS 230 |
| PIN 15 | GREQ1_ | COMB. ; | OUTPUT TO PCI BRIDGE 206 CORRESPONDING TO REQUEST 1 FROM A DEVICE 1 ON SECONDARY BUS 230 |
| PIN 16 | GREQ2_ | COMB. ; | OUTPUT TO PCI BRIDGE 206 CORRESPONDING TO REQUEST 2 FROM A DEVICE 2 ON SECONDARY BUS 230 |
| PIN 17 | GREQ3_ | COMB. ; | OUTPUT TO PCI BRIDGE 206 CORRESPONDING TO REQUEST 3 FROM A DEVICE 3 ON SECONDARY BUS 230 |
| PIN 18 | GREQ4_ | COMB. ; | OUTPUT TO PCI BRIDGE 206 CORRESPONDING TO REQUEST 4 FROM A DEVICE 4 ON SECONDARY BUS 230 |
| PIN 19 | STATE0 | REG. ; | FIRST ORDER BIT OF STATE MACHINE |

-continued

| PIN 20 | STATE1 | REG. | ; | SECOND ORDER BIT OF STATE MACHINE |
| PIN 21 | STATE2 | REG. | ; | THIRD ORDER BIT OF STATE MACHINE |
| PIN 22 | MULTIPLE_REQS_ | REG. | ; | OUTPUT TO FIRST LOGIC 400 INDICATING THERE IS MULTIPLE REQUESTS FROM DEVICES ON SECONDARY BUS 230 |
| PIN 23 | SERIALREQ_ | COMB. | ; | OUTPUT TO FIRST LOGIC 400 INDICATES THERE IS ANOTHER REQ WAITING |
| PIN 24 | VCC | | | |

For ease in explanation, detailed logic for first logic 400 is described below. A "*" represents a logical AND, a "+" represents a logical OR, a "/" before a name represents a logical NOT., and a ":" before "=" represents "latched" (i.e., state can only change on rising edge of clock). Again, a "_" after a name represents active LOW.

1. Latched FRAME—Indicates FRAME is latched on PCI clock edge transitioning from HIGH to LOW.

/LSFRAME_:=/SFRAME_

2. As indicated by the logic below, first logic 400 asserts NEXT_STATE_ on the first clock of FRAME (i.e., LSFRAME_ not asserted) to inform second logic 450 that a secondary PCI bus cycle utilizing memory 202 (i.e., DMA R/W, indicated by asserted SFRAME, SAD31 and SCBE2) has started and that the STATE (i.e., determined by three state machine bits STATE0, STATE1, and STATE2, described in more detail herein) should now be advanced to the next state because there is at least one REQ_ waiting, which will be indicated by SERIALREQ_ being asserted. NEXT_STATE_ de-asserts once it detects that SERIALREQ_ has de-asserted (i.e., no more REQs_ or MULTIPLE_ REQs_ asserted), or that PCI bus 230 is idle (i.e., SFRAME and SIRDY de-assert).

/NEXT_STATE_:= (LSFRAME_ * /SFRAME_ * SAD31 * SCBE2 * /SERIALREQ_) + (/NEXT_STATE_ * /(SFRAME_ * SIRDY_) * /SERIALREQ_)

3. First logic 400 asserts DMAW_ on the first clock edge of SFRAME if it detects a direct memory access (DMA) write operation (i.e., SCBE0, SAD31, and SCBE2 all asserted). DMAW_ remains asserted as long as a DMA write operation is asserted, or until secondary PCI bus 230 is idle.

/DMAW_:= (LSFRAME_ * /SFRAME_ * SCBE0 * SAD31 * SCBE2) + (/DMAW_ * /(SFRAME_ * SIRDY_))

4. First logic 400 asserts DMAR_ on the first clock edge of SFRAMED_ if a DMA read operation is detected. DMAR_ remains asserted until the first data transfer is detected, or PCI bus is idle.

/DMAR_:= (LSFRAME_ * /SFRAME_ * /SCBE0 * SAD31 * SCBE2) + (/DMAR_ * /(/SIRDY_ * /STRDY_) * /(SFRAME_ * SIRDY_))

5. LDISPST_ asserts on the first data transfer of a DMA write. When it asserts, PCI bridge 206 will respond by asserting BUFNE_ if it has posted data in its internal write buffer 252. Once the assertion of BUFNE_ is detected, LDISPST_ de-asserts.

/LDISPST_:=(/DMAW_*/SIRDY_*/STRDY_)+(/LDISPST_ *BUFNE_)

6. First logic 400 transmits LOCKOUT_ to second logic 450 to prevent the detection of a re-asserted SERIALREQ_ for the duration of a PCI bus cycle and until delivery is made of any posted write data to memory. That is, once SERIALREQ_ de-asserts, LOCKOUT_ asserts and will remain asserted until the PCI bus cycle completes and any data in internal write buffer 252 flushes. Therefore, if REQ2_ is asserted while REQ3_ is being processed, the assertion of SERIALREQ_ will not effect CPU_FLUSHREQ_ until LOCKOUT_ is de-asserted. Also, REQ2_ will not be gated to PCI bridge 206 as GREQ2_ until LOCKOUT_ de-asserts (described herein).

```
/LOCKOUT_ := (SERIALREQ_ * ((LSFRAME_ * /SFRAME_) + /DMAW_ + /DMAR_+
    /LDISPST_ + /BUFNE_)) + (/LOCKOUT_ * ((LSFRAME_ * /SFRAME_) +
    /DMAW_ + /DMAR_ + /LSIDPST_ + /BUFNE_))
```

7. LSERIALREQ_ is a latched version of SERIALREQ_.

```
/LSERIALREQ_ :=/SERIALREQ_
```

8. Logic 400 asserts CPU_FLUSHREQ_ to alert host bus bridge 232 that a valid DMA request to read or write data in memory is desirous, and that host bus bridge 232 must flush all PCI buffers (not shown) and hold off PCI cycles. CPU_FLUSHREQ_ asserts when SERIALREQ_ is or was recently asserted, and LOCKOUT_ is not asserted. CPU_FLUSHREQ_ remains asserted during the assertion of SFRAME for memory R/W, LDISPST, BUFNE, or ISA_FLUSHREQ_. Host bridge 232 responds with MEMACK_.

is not asserted, middle order bit STATE1 is asserted, and low order bit STATE0 is not asserted). SERIALREQ_ is de-asserted if both MULTIPLE_REQS_ and NEXT_STATE_ are asserted simultaneously (which forces the STATE to change to the next state), there are no more REQs, or the asserted REQ de-asserts.

```
/SERIALREQ_ = (MULTIPLE_REQS_ + NEXT_STATE_) *
    (((/REQ0_ * /STATE2 * /STATE1 * /STATE0) +
     (/REQ1_ * /STATE2 * /STATE1 * STATE0) +
     (/REQ2_ * /STATE2 * STATE1 * /STATE0) +
     (/REQ3_ * /STATE2 * STATE1 * STATE0) +
     (/REQ4_ * STATE2 * /STATE1 * /STATE0))
```

```
/CPU_FLUSHREQ_ = ((/SERIALREQ_ + /LSERIALREQ_) * LOCKOUT_) + ((LSFRAME_ * /SFRAME_
    * SAD31 * SCBE2) + /DMAW_ + /DMAR_ + /LDISPST_ + /BUFNE_ +
    /EISA_FLUSHREQ_)
```

9. Latched CPU_FLUSHREQ_.

```
/LCPU_FLUSHREQ_ :=/CPU_FLUSHREQ_
```

10. Logic 400 asserts gated MEMACK_ to the GREQ_ logic in logic 450 (described herein). G_MEMACK will assert if FLUSHREQ_ was asserted last clock cycle (i.e., /LCPU_FLUSHREQ_) and FLUSHREQ_ continues to be asserted (i.e., /CPU_FLUSHREQ_). Once asserted, G_MEMACK remains asserted until CPU_FLUSHREQ_ de-asserts.

3. Second logic generates STATE MACHINE terms to define the state transitions. The state transitions occur if SERIALREQ_ is not asserted, and another REQn is pending or more than one REQn are pending. States 0, 1, 2, 3, & 4 directly correspond to the input reqs REQ0_, REQ1_, REQ2_, REQ3_, a REQ4_.

```
/G_MEMACK_ := (/MEMACK_ * /LCPU_FLUSHREQ_ * /CPU_FLUSHREQ_) + (/G_MEMACK_ *
    /CPU_FLUSHREQ_)
```

Detailed logic for second logic 450 is described below.

1. Second logic 450 asserts MULTIPLE_REQS_ when more than one REQ is pending.

```
/MULTIPLE_REQS_ := /((REQ0_ * REQ1_ * REQ2_ * REQ3_ * REQ4_) +
                     (REQ0_ * REQ1_ * REQ2_ * REQ3_ * REQ4_) +
                     (REQ0_ * /REQ1_ * REQ2_ * REQ3_ * REQ4_) +
                     (REQ0_ * REQ1_ * /REQ2_ * REQ3_ * REQ4_) +
                     (REQ0_ * REQ1_ * REQ2_ * /REQ3_ * REQ4_) +
                     (REQ0_ * REQ1_ * REQ2_ * REQ3_ * /REQ4_))
```

2. Second logic 450 asserts SERIALREQ_ if the asserted REQn_ corresponds to the current state, e.g., REQ2 is asserted and STATE=010 (i.e., high order bit STATE2

```
STATE2 := ((/SERIALREQ_ * STATE2) + (SERIALREQ_ *
            ((/STATE2 * STATE1 * STATE0 * /REQ4_) +
            (/STATE2 * STATE1 * /STATE0 * /REQ4_ * REQ3_) +
            (/STATE2 * /STATE1 * STATE0 * /REQ4_ * REQ3_ * REQ2_) +
            (/STATE2 * /STATE1 * /STATE0 * /REQ4_ * REQ3_ * REQ2_ * REQ1_) +
            (STATE2 * /STATE1 * /STATE0 * /REQ4_ *REQ3_ * REQ2_ * REQ1_
            REQ0_) +
            (STATE2 * REQ3_ * REQ2_ * REQ1_ * REQ0_ ))))
STATE1 := ((/SERIALREQ_ * STATE1) + (SERIALREQ_ *
            ((/STATE2 * /STATE1 * STATE0 * /REQ2_) +
            (/STATE2 * /STATE1 * /STATE0 * /REQ2_ * REQ1_) +
            (STATE2 * /STATE1 * /STATE0 * /REQ2_ * REQ1_ * REQ0_) +
            (/STATE2 * STATE1 * STATE0 * /REQ2_ * REQ1_ * REQ0_ * REQ4_) +
            (/STATE2 * STATE1 * /STATE0 * /REQ3_) +
            (/STATE2 * /STATE1 * STATE0 * /REQ3_ * REQ2_) +
            (/STATE2 * /STATE1 * /STATE0 * /REQ3_ * REQ2_ * REQ1_) +
            (STATE2 * /STATE1 * /STATE0 * /REQ3_ * REQ2_ * REQ1_ * REQ0_) +
            (STATE1 * REQ4_ * REQ1_ * REQ0_))))
STATE0 := ((/SERIALREQ_ * STATE0) + (SERIALREQ_ *
            ((/STATE2 * /STATE1 * /STATE0 * /REQ1_) +
            (STATE2 * /STATE1 * /STATE0 * /REQ1_ * REQ0_) +
            (/STATE2 * STATE1 * STATE0 * /REQ1_ * REQ0_ * REQ4_ ) +
            (/STATE2 * STATE1 * /STATE0 * /REQ1_ * REQ0_ * REQ4_ REQ3_) +
            (/STATE2 * STATE1 * /STATE0 * /REQ3_) +
            (/STATE2 * /STATE1 * STATE0 * /REQ3_ * REQ2_) +
            (/STATE2 * /STATE1 * /STATE0 * /REQ3_ * REQ2_ * REQ1_) +
            (STATE2 * /STATE1 * /STATE0 * /REQ3_ * REQ2_ * REQ1_ * REQ0_) +
            (STATE0 * REQ4_ * REQ2_ * REQ0_))))
```

4. GREQn_ is used to present only one REQn_ at a time to PCI bridge 206. REQn_ will only be forwarded to GREQn_ if: REQn_ is asserted, STATEn_ is in the corresponding state (e.g. REQ1_ & STATE=001), G_MEMACK_ is asserted indicating that logic 400 is ready, LOCKOUT_ is de-asserted indicating logic 400 is not busy, and MULTIPLE_REQS_ and NEXT_STATE_ are not both asserted (indicating that SERIALREQ_ has not been forced inactive so that the STATE can advance to next state).

```
/GREQ0_ = /REQ0_ * /STATE2 * /STATE1 * /STATE0 *
          /G_MEMACK_ * LOCKOUT_ * (MULTIPLE_REQS_ + NEXT_STATE_)
/GREQ1_ = /REQ1_ * /STATE2 * /STATE1 * STATE0 *
          /G_MEMACK_ * LOCKOUT_ * (MULTIPLE_REQS_ + NEXT_STATE_)
/GREQ2_ = /REQ2_ * /STATE2 * STATE1 * /STATE0 *
          /G_MEMACK_ * LOCKOUT_ * (MULTIPLE_REQS_ + NEXT_STATE_)
/GREQ3_ = /REQ3_ * /STATE2 * STATE1 * STATE0 *
          /G_MEMACK_ * LOCKOUT_ * (MULTIPLE_REQS_ + NEXT_STATE_)
/GREQ4_ = /REQ4_ * STATE2 * /STATE1 * /STATE0 *
          /G_MEMACK_ * LOCKOUT_ * (MULTIPLE_REQS_ + NEXT_STATE_)
```

While the invention has been shown and described with reference to particular embodiments thereof, it will be understood by those skilled in the art that the foregoing and other changes in form and detail my be made therein without departing from the spirit and scope of the invention.

I claim:

1. A computer-implemented method for preventing a livelock condition between a host bus bridge and a bus bridge, the bus bridge having an internal write buffer, wherein the host bus bridge must complete all I/O requests for a central processing unit before allowing the bus bridge access to a system memory, and the bus bridge must flush the internal write buffer before permitting the host bus bridge to access a plurality of peripherals on a secondary bus, comprising the steps of:

(a) in response to at least first and second requests being substantially simultaneously received from at least first and second peripherals, determining if a state of a state machine corresponds to an assigned order of either the first peripheral or the second peripheral;

(b) if the state does not correspond to the assigned order of the first peripheral or the second peripheral, advancing the state and repeating step (a) until the state corresponds to one of the first or second peripherals;

(c) if the state corresponds to the assigned order of either the first or second peripheral, determining if the selected request targets the system memory;

(d) if the selected request targets the system memory, requesting the host bus bridge to flush all existing I/O requests and postpone any future I/O requests from the central processing unit; and (e) in response to a notification from the host bus bridge that all I/O requests have been flushed and that any future I/O requests from the central processing unit will be postponed, unmasking the selected request to the bus bridge, thereby granting access of the secondary bus to the selected peripheral.

2. The method according to claim 1, further comprising the steps of:

(f) in response to the selected peripheral accessing the secondary bus and targeting the system memory, advancing the state of the state machine;

(g) in response to the selected peripheral accessing the secondary bus, preventing the host bus bridge from flushing all existing I/O requests and postponing any future I/O requests from the central processing unit in response to the active non-selected request; and (h) in response to the selected peripheral releasing access to the secondary bus, repeating steps (b) through (g) using the non-selected request.

* * * * *